(12) United States Patent  (10) Patent No.: US 8,769,487 B2
Chandrasekharan  (45) Date of Patent: Jul. 1, 2014

(54) CONFIGURABLE AUTO CONTENT TESTING FRAMEWORK FOR TECHNICAL DOCUMENTATION

(75) Inventor: Suresh Chandrasekharan, Bangalore (IN)

(73) Assignee: Oracle International Corporation, Redwood City, CA (US)

( * ) Notice: Subject to any disclaimer, the term of this patent is extended or adjusted under 35 U.S.C. 154(b) by 147 days.

(21) Appl. No.: 13/443,436

(22) Filed: Apr. 10, 2012

(65) Prior Publication Data

US 2013/0268917 A1   Oct. 10, 2013

(51) Int. Cl.
*G06F 9/44* (2006.01)
*G06F 9/445* (2006.01)

(52) U.S. Cl.
USPC ............................ 717/106; 717/115; 717/168

(58) Field of Classification Search
USPC ......................................... 717/106, 115, 168
See application file for complete search history.

(56) References Cited

U.S. PATENT DOCUMENTS

| | | | |
|---|---|---|---|
| 5,745,767 A * | 4/1998 | Rosen et al. | 717/124 |
| 6,421,822 B1 * | 7/2002 | Pavela | 717/125 |
| 7,185,235 B2 | 2/2007 | Radestock | |
| 7,634,591 B2 | 12/2009 | Irish et al. | |
| 2003/0227480 A1 | 12/2003 | Polk | |
| 2004/0205560 A1 | 10/2004 | Polk | |
| 2009/0288072 A1 | 11/2009 | Kania | |
| 2010/0269100 A1 | 10/2010 | King et al. | |

OTHER PUBLICATIONS

Zimmerly, B., "Advanced Techniques for using the UNIX Find Command", http://www.ibm.com/developerworks/aix/library/au-unix-find.html, Mar. 28, 2006, 5 pages.

* cited by examiner

*Primary Examiner* — Chuck Kendall
(74) *Attorney, Agent, or Firm* — Osha Liang LLP

(57) ABSTRACT

A system including a processor, a memory store, and a script generation engine. The script generation engine is configured to generate a test script comprising a test command instruction obtained from the technical documentation file, and submit a first query to the command configuration database using the test command instruction. The script generation engine is further configured to submit a second query to the command configuration database using the input parameter argument and the input parameter state, receive a second command entry comprising a prerequisite command instruction, an output parameter argument, and an output parameter state, where the output parameter argument matches the input parameter argument and the output parameter state matches the input parameter state, modify the test script to obtain an updated test script, and execute the updated test script on a target operating system.

20 Claims, 10 Drawing Sheets

Command Configuration Database
700

Command Entry A
702A command_instruction = zpool
command_type = create
input_arguments = file
Input_state = sizeset
output_arguments = zpool
output_state = created
command_example='zpool create _zpool_ _any_'

Command Entry B
702B command_instruction = mkfile
command_type = create
input_arguments = filesize, file
Input_state = existing, created
output_arguments = file
output_state = sizeset
command_example='mkfile -n _filesize_ _file_'

Command Entry C
702C command_instruction = mktemp
command_type = create
input_arguments = dir
Input_state = created
output_arguments = file
output_state = created
command_example='_file_ = 'mktemp -p @@dir@@''

Command Entry D
702D command_instruction = mkdir
command_type = create
input_arguments = dir
Input_state = existing
output_arguments = dir
output_state = created
command_example='mkdir -p @@dir@@'

FIG. 7A

CONFIGURABLE AUTO CONTENT TESTING FRAMEWORK FOR TECHNICAL DOCUMENTATION

BACKGROUND

Operating systems and other complex computer programs require extensive testing before deployment on a large scale. This testing includes verifying that commands used to interact with the system are operational.

SUMMARY

In general, in one aspect, the invention relates to a system including a processor, a memory store, and a script generation engine. The memory store is configured to store a technical documentation file and a command configuration database. The script generation engine executing on the processor and configured to generate a test script comprising a test command instruction obtained from the technical documentation file, submit a first query to the command configuration database using the test command instruction, and receive, in response to the first query, a first command entry comprising an input parameter argument and an input parameter state of the test command instruction. The script generation engine is further configured to submit a second query to the command configuration database using the input parameter argument and the input parameter state, receive, in response to the second query, a second command entry comprising a prerequisite command instruction, an output parameter argument, and an output parameter state, where the output parameter argument matches the input parameter argument and the output parameter state matches the input parameter state, and modify the test script to obtain an updated test script, where the updated test script comprises the prerequisite command instruction. The script generation engine is further configured to execute the updated test script on a target operating system, where executing the prerequisite command instruction generates an output parameter comprising the output parameter argument and the output parameter state, and where executing the test command instruction consumes the output parameter.

In general, in one aspect, the invention relates to a method for generating a test script for an operating system. The method includes generating a test script comprising a test command instruction obtained from a technical documentation file, submitting a first query to a command configuration database using the test command instruction, and receiving, in response to the first query, a first command entry comprising an input parameter argument and an input parameter state of the test command instruction. The method further includes submitting a second query to the command configuration database using the input parameter argument and the input parameter state, receiving, in response to the second query, a second command entry comprising a prerequisite command instruction, an output parameter argument, and an output parameter state, wherein the output parameter argument matches the input parameter argument and the output parameter state matches the input parameter state, and modifying the test script to obtain an updated test script, wherein the update test script comprises the prerequisite command instruction. The method further includes executing the test script on a processor on a target operating system, wherein executing the prerequisite command instruction generates an output parameter comprising the output parameter argument and the output parameter state, and wherein executing the test command instruction consumes the output parameter.

In general, in one aspect, the invention relates to a computer readable medium comprising instructions that, when executed by a processor, perform a method. The method includes generating a test script comprising a test command instruction obtained from a technical documentation file, submitting a first query to a command configuration database using the test command instruction, and receiving, in response to the first query, a first command entry comprising an input parameter argument and an input parameter state of the test command instruction. The method further includes submitting a second query to the command configuration database using the input parameter argument and the input parameter state, receiving, in response to the second query, a second command entry comprising a prerequisite command instruction, an output parameter argument, and an output parameter state, wherein the output parameter argument matches the input parameter argument and the output parameter state matches the input parameter state, and modifying the test script to obtain an updated test script, wherein the update test script comprises the prerequisite command instruction. The method further includes executing the test script on a processor on a target operating system, wherein executing the prerequisite command instruction generates an output parameter comprising the output parameter argument and the output parameter state, and wherein executing the test command instruction consumes the output parameter.

Other aspects of the invention will be apparent from the following description and the appended claims.

BRIEF DESCRIPTION OF DRAWINGS

FIGS. 7A-7B show an example in accordance with one or more embodiments of the invention.

DETAILED DESCRIPTION

Figure 1:
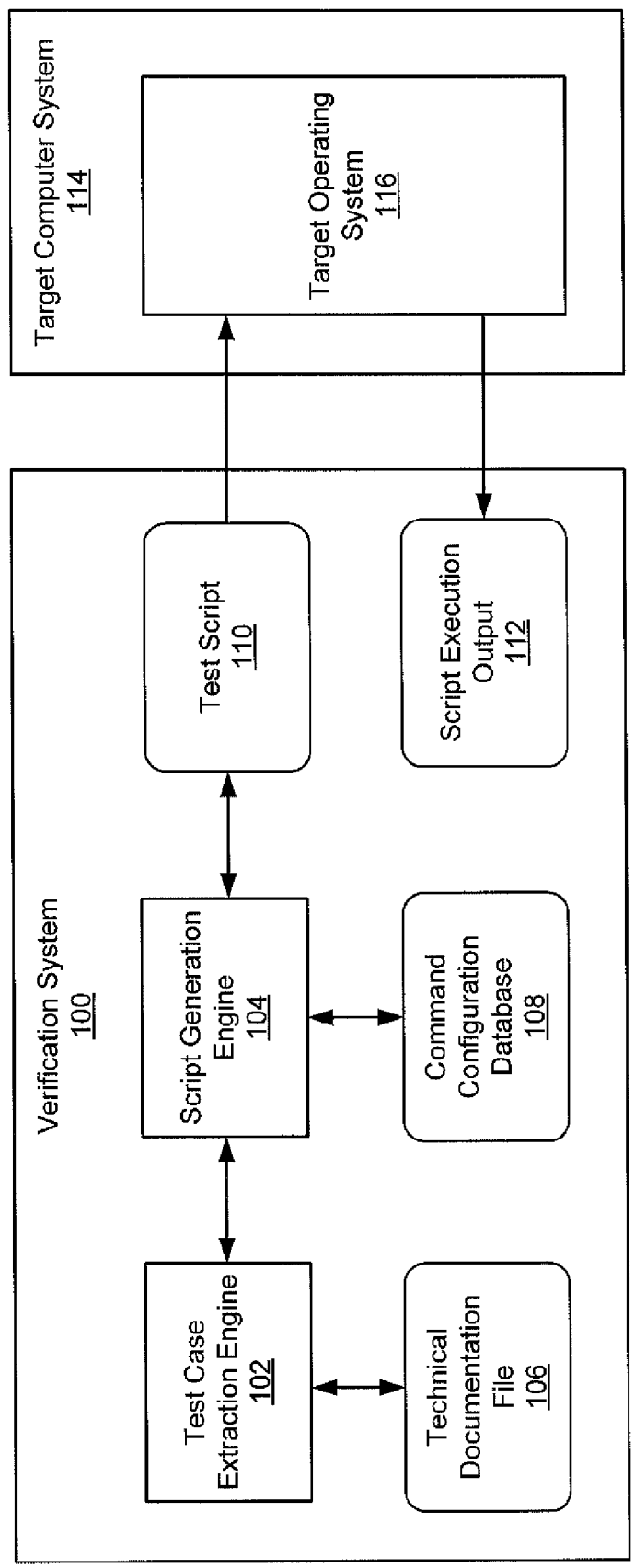
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for generating test scripts for an operating system. Specifically, embodiments of the invention may be used to extract commands from a technical documentation file and generate a test script that includes the prerequisite commands necessary to properly test the extracted command.

FIG. 1 shows a diagram of a system in accordance with one or more embodiments of the invention. As shown in FIG. 1, the verification system (100) includes a test case extraction engine (102) and a script generation engine (104). The verification system (100) also includes a technical documentation file(s) (106), a command configuration database (108), a test script(s) (110), and script execution output (112). The target computer system (114) includes a target operating system (116). Each of these elements is described in detail below.

In one or more embodiments of the invention, the verification system is a computer system or group of computer systems configured to execute the test case extraction engine (102) and the script generation engine (104). In one embodiment of the invention, the verification system includes hardware (e.g., one or more processors, memory, persistent storage device(s)), software (e.g., operating system, test case extraction engine (102) and a script generation engine (104)), and data (e.g., technical documentation file (106), a command configuration database (108), test script (110), and script execution output (112)).

In one or more embodiments of the invention, the technical documentation file (106) is a file storing human-readable text. In one embodiment of the invention, the technical documentation file (106) text describes how an operating system (e.g., target operating system (116)) is installed, modified, and used. Specifically, in one embodiment of the invention, the technical documentation file (106) describes commands that invoke an expected response by an operating system. The technical documentation file (106) is described in detail in FIG. 2.

In one or more embodiments of the invention, the test case extraction engine (102) is a process or group of processes configured to interact with the technical documentation file (106). Specifically, the test case extraction engine (102) is configured to extract commands and data associated with the commands from the technical documentation file. The test case extraction engine (102) may then provide the extracted data to the script generation engine (104).

In one or more embodiments of the invention, the command configuration database (108) is a repository that stores commands and data associated with commands. In one embodiment of the invention, the command configuration database (108) is indexed by command instructions for each command. Further detail about the command configuration database (108) is provided in FIG. 3.

In one or more embodiments of the invention, the script generation engine (104) is a process or group of processes configured to generate a test script (110) by interacting with the test case extraction engine (102) and the command configuration database (108). Specifically, the script generation engine (104) generates a command test script (see FIG. 4A) from a sequence of continuous commands (optionally separated by command outputs) extracted from the technical documentation file (106) by the test case extraction engine (102) using the command configuration database (108). The script generation engine (104) generates the test script (110) from the generated set of command test scripts. The process by which the script generation engine (104) generates the test script (110) is described in detail in FIG. 6.

In one or more embodiments of the invention, the test script (110) is a set of computer instructions generated by the script generation engine (104) and submitted to the target operating system (116) on the target computer system (114). In one or more embodiments of the invention, the test script (110) is used to verify that each command extracted from the technical documentation file (106) for the target operating system (116) produces the expected result. For example, test script (110) may include a command test script for a "delete file" command, and the expected result for the "delete file" command may be that a target file has been deleted. Further detail about the test script (110) is provided in FIGS. 4A and 4B.

In one or more embodiments of the invention, the script execution output (112) is a collection of responses from the target operating system (116) sent as a result of executing the test script. In one embodiment of the invention, the script execution output (112) is a data log describing the results of executing each script command on the target operating system (116). The script execution output may include indications of success or failure in executing a command, and may provide detail regarding the resulting state.

In one or more embodiments of the invention, the target computer system (114) is a computer system configured to execute the target operating system (116). In one or more embodiments of the invention, the target operating system (116) is a program or set of programs executing on the target computer system (114) that work together to create an abstraction layer that provides system hardware resources to higher-level programs on the system.

In one embodiment of the invention, the target operating system (116) is an operating system undergoing testing to verify that the operating system produces the expected results in response to submitted commands. target operating system (116) may be an operating system under development (e.g., in "alpha" or "beta" testing). In one embodiment of the invention, target operating system (116) is an operating system that has previously undergone a modification (e.g., an upgrade, patch, etc.).

Figure 2:
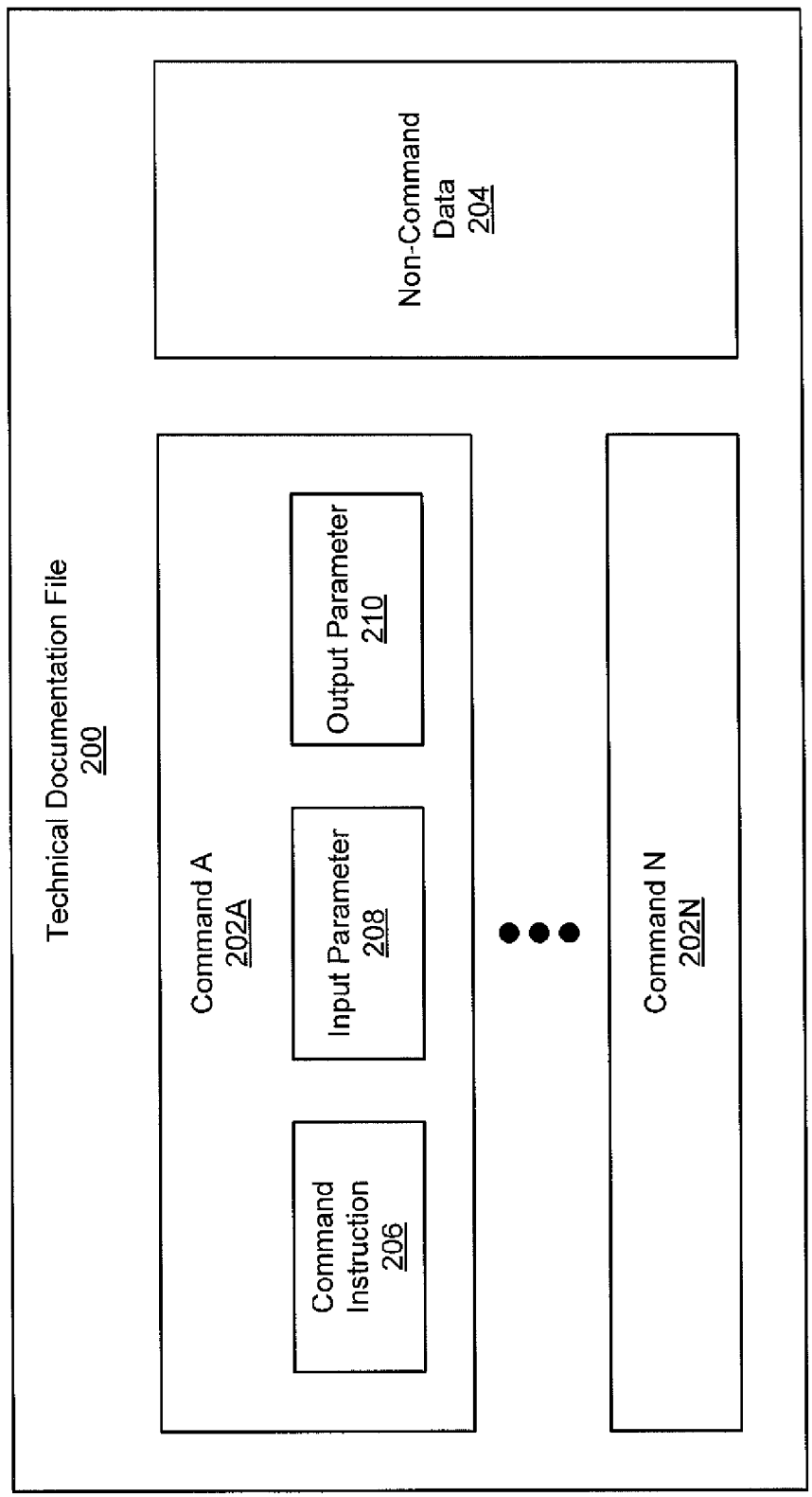
FIG. 2 shows a system in accordance with one or more embodiments of the invention.

FIG. 2 shows a technical documentation file in accordance with one or more embodiments of the invention. As shown in FIG. 2, the technical documentation file (200) includes multiple commands (command A (202A), command N (202N)) and non-command data (204). Each command (command A (202A), command N (202N)) includes a command instruction (206), an optional input parameter (208), and an optional output parameter (210).

In one or more embodiments of the invention, a command (command A (202A), command N (202N)) (also referred to as a task) is a directive phrase which accomplishes a certain end result when run on a target computer. Each command may include one or more command instructions (206). In one embodiment of the invention, a command instruction (206) is a base term or phrase invoking the command. For example, the pseudo code command "copy oldfile to newfile" includes the command instruction "copy."

In one or more embodiments of the invention, each command includes zero or more input parameters (208) and zero or more output parameters (210). The absence of an input parameter may imply that the parameter is implicitly available in the system. The absence of an output parameter may imply that either the command creates no output or that the output parameter is implicitly created. In one embodiment of the invention, an input parameter (208) describes an argument and state of a data object that is needed by the command instruction. In one embodiment of the invention, an output parameter (210) describes an argument and state of a data element that is the result of the command instruction acting upon the input parameter (208). Details regarding input arguments, input states, output arguments, and output states is provided in FIG. 3.

In one or more embodiment of the invention, the non-command data (204) is information within the technical documentation file (200) other than commands (command A (202A), command N (202N)). In one embodiment of the invention, non-command data (204) is human readable data used to describe the commands (command A (202A), command N (202N)). In one embodiment of the invention, the test case extraction engine (102 in FIG. 1) is configured to recognize and distinguish between non-command data (204) and command data (command A (202A), command N (202N)).

Figure 3:
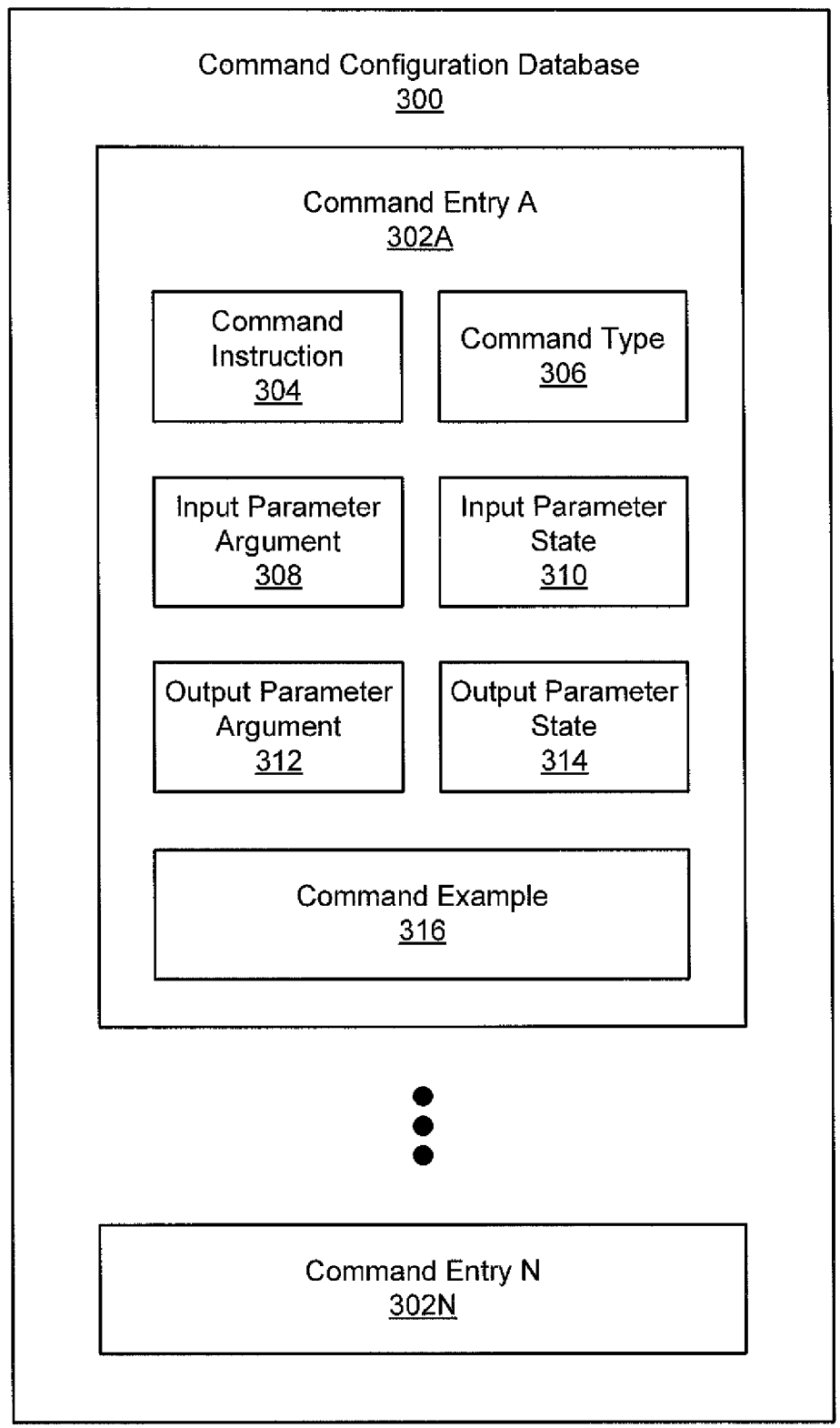
FIG. 3 shows a system in accordance with one or more embodiments of the invention.

FIG. 3 shows a command configuration database in accordance with one or more embodiments of the invention. As shown in FIG. 3, the command configuration database (300) includes multiple command entries (command entry A (302A), command entry N (302N)). Each command entry (command entry A (302A), command entry N (302N)) includes a command instruction (304), a command type (306), an input parameter argument (308), an input parameter state (310), an output parameter argument (312), an output parameter state (314), and a command example (316).

In one embodiment of the invention, each command entry (command entry A (302A), command entry N (302N)) is generated by the script generation engine based on command data extracted by the test case extraction engine. In one embodiment of the invention, command entry A (302A) includes a command instruction (304) corresponding to the command instruction extracted from the command in the technical documentation file.

In one or more embodiments of the invention, the command type (306) is a general description of the task invoked by the command. Examples of command types (306) include, but are not limited to, create, modify, and destroy. In one or more embodiments of the invention, the input parameter argument (308) describes the argument expected as an input parameter for the command instruction. In one embodiment of the invention, the input parameter state (310) describes an attribute of the expected argument. For example, an input parameter argument (308) may be an array data structure, and a corresponding input parameter state (310) may describe the expected array as created with a set size.

In one or more embodiments of the invention, the output parameter argument (312) describes the argument that results from the task acting on the input parameter. In one embodiment of the invention, the output parameter state (314) describes an attribute of the resulting argument. For example, an output parameter argument (312) may be a file, and a corresponding output parameter state (310) may describe the file as having been created.

In one or more embodiments of the invention, the command example (316) is a complete executable command entry provided for illustrative purposes. The command example (316) may include pseudo arguments to be replaced by actual arguments when a script is created for execution on the target machine. In one embodiment of the invention, the command example (316) and pseudo arguments illustrates the example command usage that will produce a specific output parameter state from a specific input parameter state.

Figure 4A:
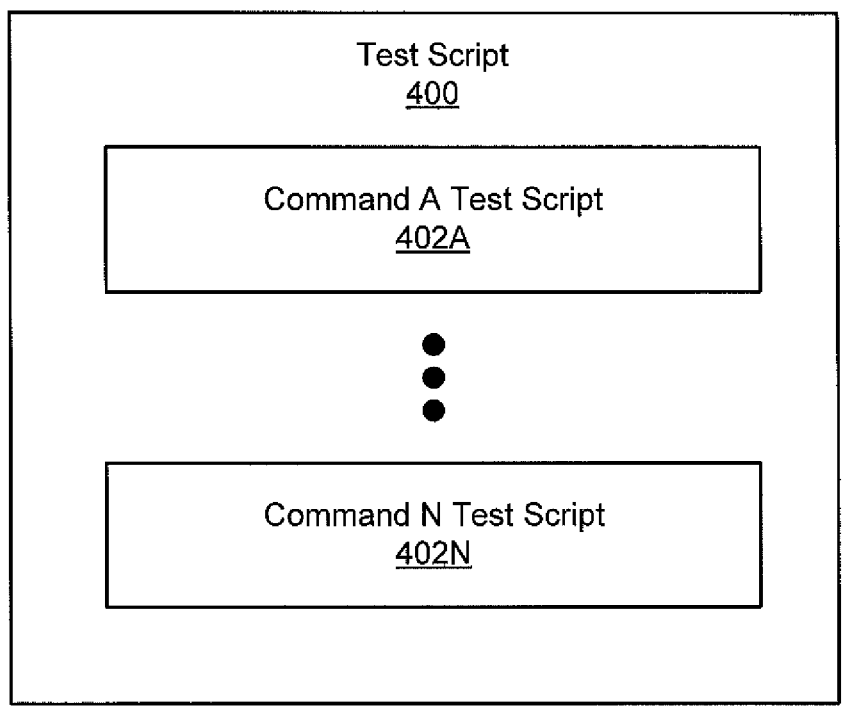
FIGS. 4A-4B show a system in accordance with one or more embodiments of the invention.

FIG. 4A shows a test script in accordance with one or more embodiments of the invention. As shown in FIG. 4A, the test script (400) includes multiple command test scripts (command A test script (402A), command N test script (402N)). In one embodiment of the invention, elements within each command test script (command A test script (402A), command N test script (402N)) may be consolidated and/or reordered without deviating from the scope of the invention. For example, some or all prerequisite command may be executed as a group before the commands being tested are executed.

Figure 4B:
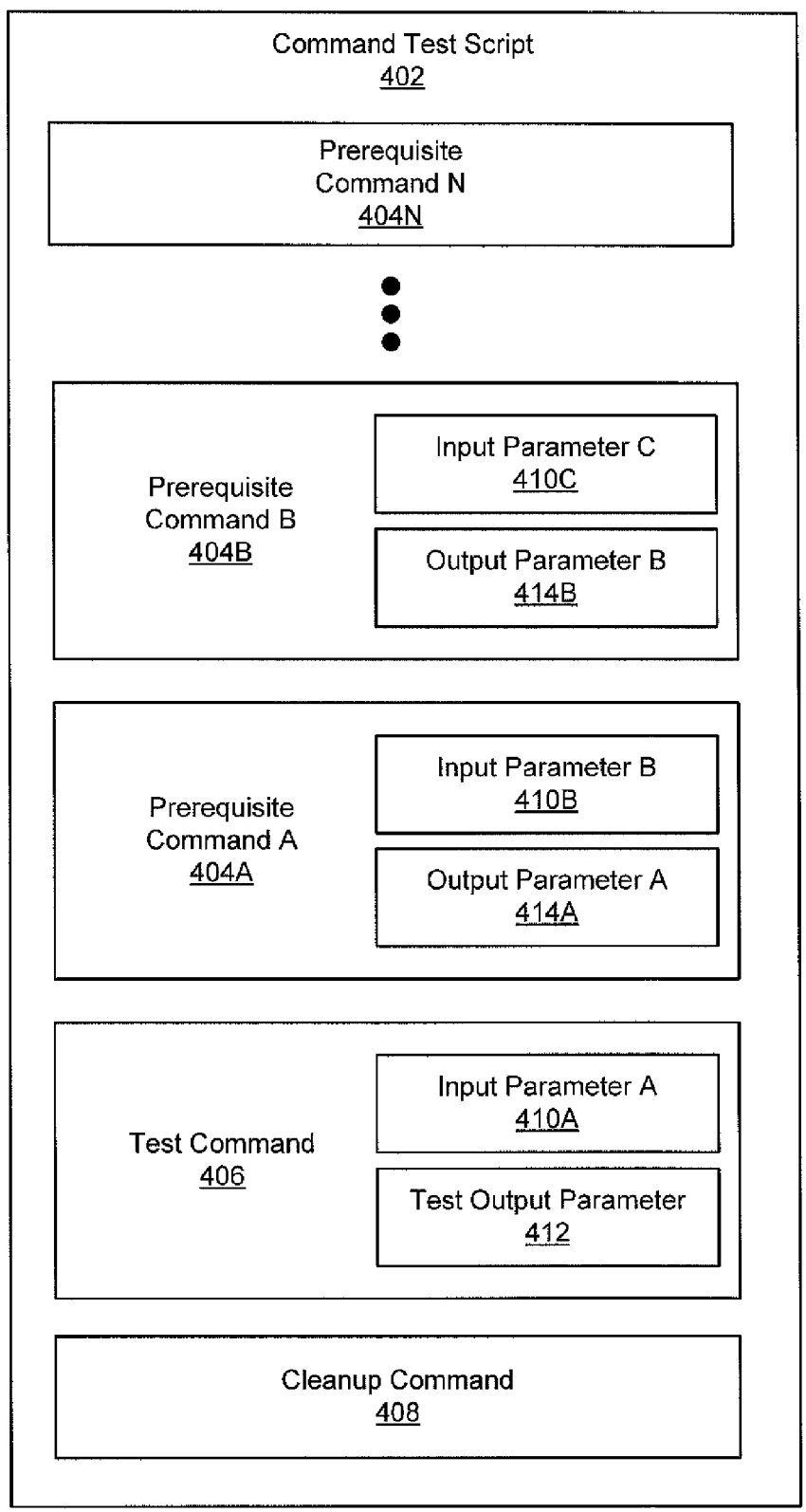

FIG. 4B shows a command test script in accordance with one or more embodiments of the invention. As shown in FIG. 4B, the command test script (402) includes multiple prerequisite commands (prerequisite command A (404A), prerequisite command B (404B), prerequisite command N (404N)), a test command (406) and a cleanup command (408). The test command (406) includes input parameter A (410A) and test output parameter (412). Each prerequisite command (prerequisite command A (404A), prerequisite command B (404B), prerequisite command N (404N))) includes an input parameter (input parameter B (410B), input parameter C (410C)) and an output parameter (output parameter A (414A), output parameter B (414B)).

In one or more embodiments of the invention, a prerequisite command is a command that, when invoked, creates an output parameter with an output parameter argument and an output parameter state that matches a certain command's input parameter argument and input parameter state. In one embodiment of the invention, a command may require specific data to properly execute, and a prerequisite command generates the required data. Further, a prerequisite command may also have specific data input requirements, and may itself require a prerequisite command to properly execute. As a result, any given test command may require any number of prerequisite commands to be executed prior to executing the test command. In one embodiment of the invention, prerequisite commands are added to a command test script until a prerequisite command is added that requires no input data, or requires only input data that already exists on the target operating system.

Figure 5:
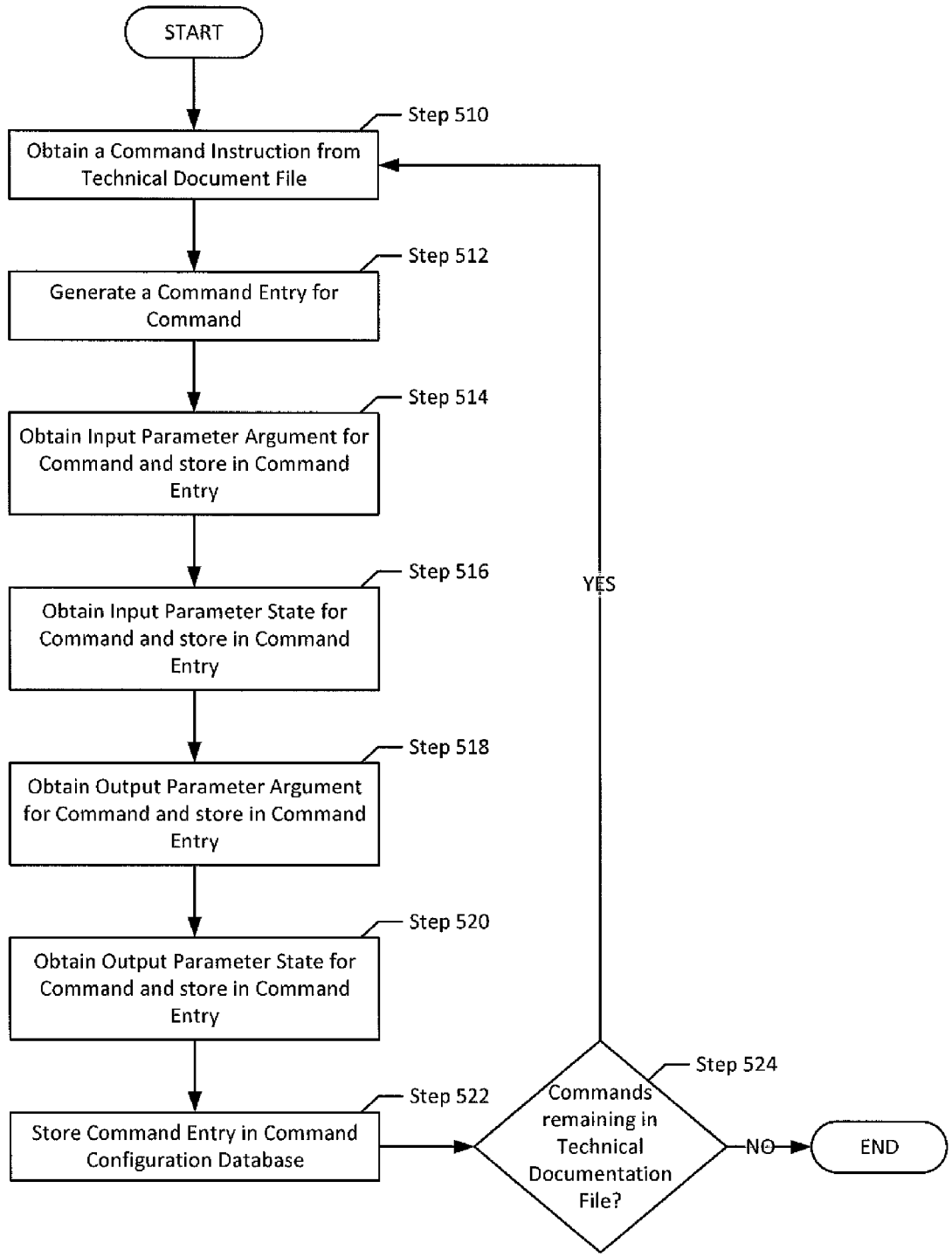
FIG. 5 shows a flow diagram in accordance with one or more embodiments of the invention.

FIG. 5 shows a flowchart for generating a command configuration database in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel.

In Step 510, a command instruction is obtained from the technical documentation file. In Step 512, a command entry for the command is generated. In Step 514, an input parameter argument for the command is obtained and stored in the command entry. In Step 516, an input parameter state for the command is obtained and stored in the command entry. In Step 518, an output parameter argument for the command is obtained and stored in the command entry. In Step 520, an output parameter state for the command is obtained and stored in the command entry. In Step 522, the command entry is stored in the command configuration database.

In Step 524, a determination about whether commands remain in the technical documentation file that are to be added to the command configuration database. If command remain in the technical documentation file, then a new command entry is generated using the remaining command in Step 510.

Figure 6:
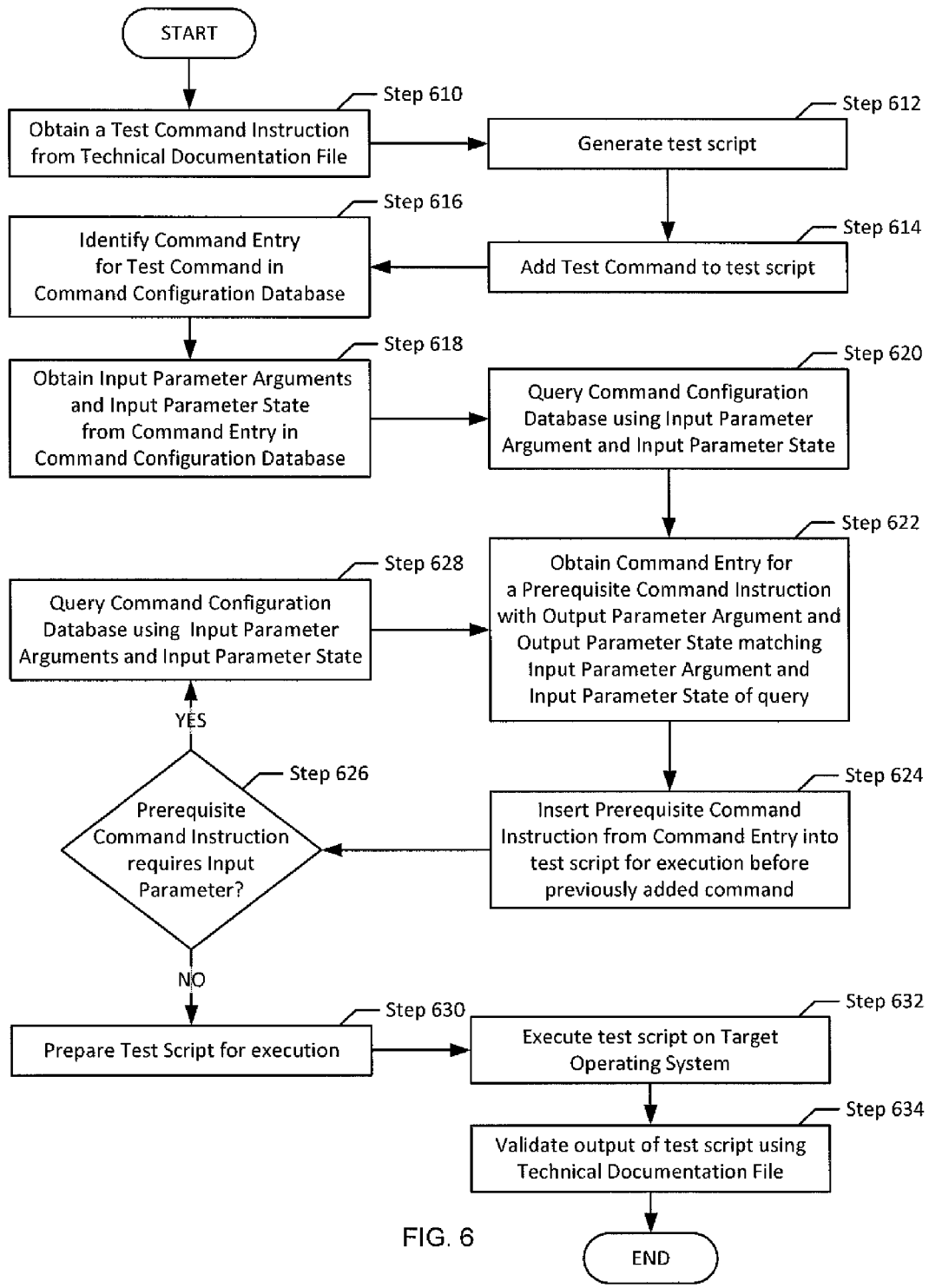
FIG. 6 shows a flow diagram in accordance with one or more embodiments of the invention.

FIG. 6 shows a flowchart for generating a test script in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel.

In Step 610, the test case extraction engine obtains a test command instruction from the technical documentation file. In Step 612, the script generation engine generates a test script. In one embodiment of the invention, the script generation engine creates an empty test script (i.e., a test script containing no commands), and populates the test script with command test scripts, test commands, and prerequisite example commands.

In Step 614, the script generation engine adds the test command instruction to the test script. In Step 616, the script generation engine identifies a command entry in the command configuration database corresponding to the test command. In Step 618, the script generation engine obtains the input parameter argument and input parameter state from the command entry in command configuration database. In one embodiment of the invention, the input parameter argument and input parameter state obtained by the script generation engine corresponds to the data that the test command requires to execute properly. In Step 620, the script generation engine queries the command configuration database using the input parameter argument and input parameter state. In one embodiment of the invention, the purpose of the query is to obtain a second command (i.e. a prerequisite command) that will generate the data that the test command requires to execute properly. In one embodiment of the invention, multiple queries may be necessary to obtain prerequisite commands to properly create, as output arguments and states, all necessary input parameter arguments and input parameter states.

In Step 622, the script generation engine obtains a command entry for a prerequisite command instruction with an output parameter argument and output parameter state matching the input parameter argument and input parameter state of the submitted query. In Step 624, the script generation engine inserts the prerequisite example instruction from command entry into test script for execution before previously added command. In one embodiment of the invention, the pseudo arguments in the prerequisite example commands will be replaced with extracted or derived arguments the context of current test command script.

In Step 626, the script generation engine determines whether the prerequisite command instruction requires an input parameter to execute properly. In one embodiment of the invention, if the previously added prerequisite command does not require an input parameter to execute properly, then that prerequisite instruction may be executed without executing any command before it. If in Step 626, the script generation engine determines that the prerequisite command instruction requires an input parameter to execute properly, then in Step 628, the script generation engine queries the command configuration database using the input parameter argument and input parameter state of the previously added command instruction.

If in Step 626, the script generation engine determines that the prerequisite command instruction does not require an input parameter to execute properly, then in Step 630, the script generation engine prepares the test script for execution. In one embodiment of the invention, preparing the test script includes inserting cleanup commands into the test script. In one embodiment of the invention, the test commands, prerequisite example commands, and cleanup commands may be consolidated and reordered to facilitate execution by the target operating system as part of the test script preparation. In one embodiment of the invention, the pseudo arguments in the prerequisite example commands will be replaced with extracted or derived arguments the context of current test command script. In Step 632, the test script is executed on the target operating system. In Step 634, the script execution output is validated using the technical documentation file.

FIG. 7A shows an example command configuration database in accordance with one or more embodiments of the invention. As shown in exemplary FIG. 7A, the command configuration database (700) includes command entry A (702A), command entry B (702B), command entry C (702C), and command entry D (702D). Command entry A (702A) is a command entry for the zpool command. Command entry B (702B) is a command entry for the mkfile command. Command entry C (702C) is a command entry for the mktemp command. Command entry D (702D) is a command entry for the mkdir command.

Figure 7B:
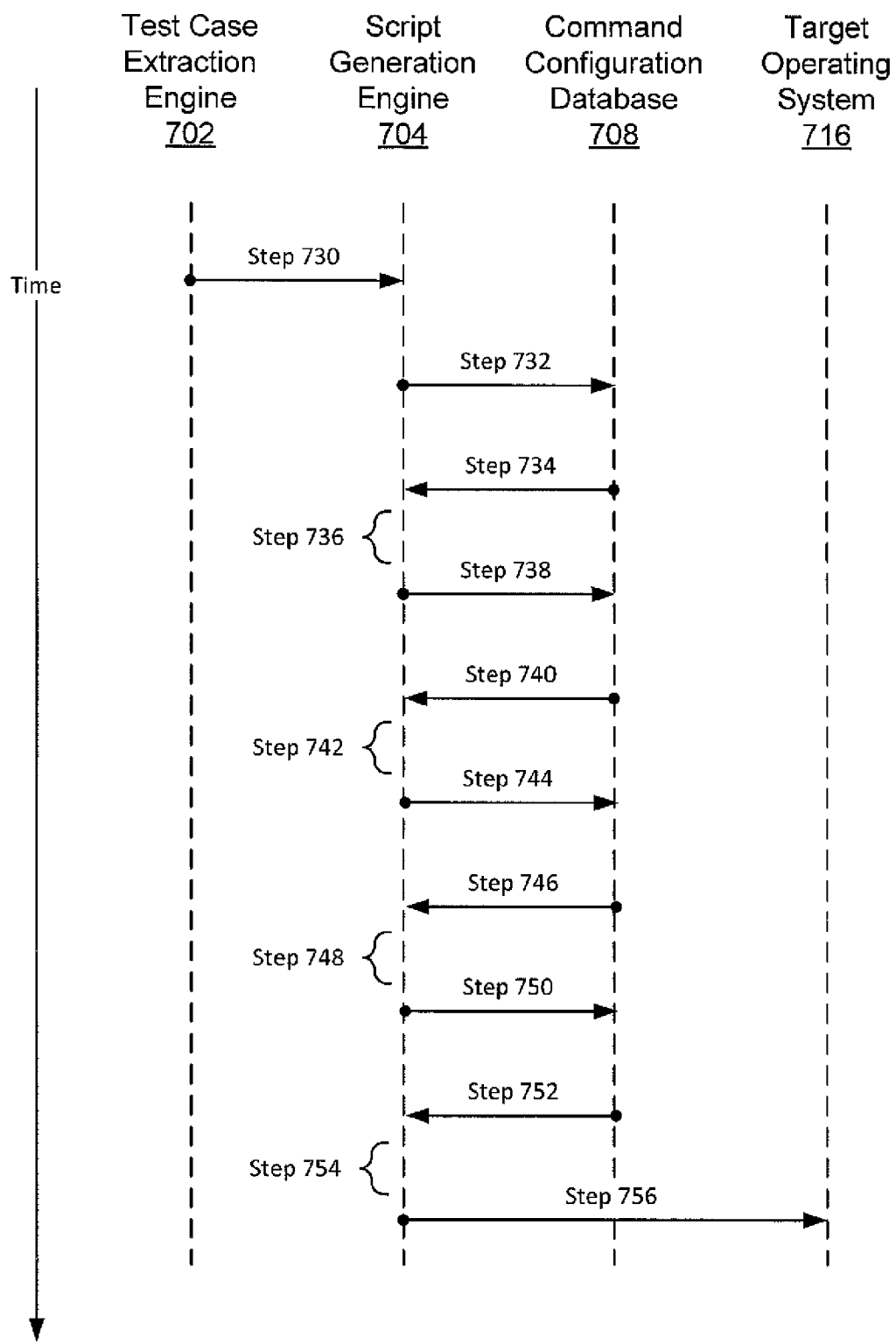

FIG. 7B shows an example timeline in accordance with one or more embodiments of the invention. In Step 730, the test case extraction engine (702) provides a test command (zpool) to the script generation engine (704). In Step 732, the script generation engine (704) generates a test script, adds a test command to the test script, and queries the command configuration database (708) to identify a command entry corresponding to the zpool command. In Step 734, the script generation engine (704) receives command entry A. In Step 736, the script generation engine (704) determines that the test command requires a prerequisite command based on the input parameters in command entry A.

In Step 738, the script generation engine (704) requests a command entry with output parameters matching the input parameters in command entry A. In Step 740, the script generation engine (704) receives command entry B. In Step 742, the script generation engine (704) determines that the command in command entry B requires a preceding prerequisite command based on the input parameters in command entry B. In Step 744, the script generation engine (704) requests a command entry with output parameters matching the input parameters in command entry B. In Step 746, the script generation engine (704) receives command entry C. For command entry B, there are 2 input arguments, 'filesize' and 'file,' with corresponding states 'existing' and 'created.' The state 'existing' in context of the command configuration database refers to a state that is final and needs no further pre-requisites. Consequently, only the 'file' input argument with its state 'created' is used to find a pre-requisite command with output argument and state matching 'file' and 'created.'

In Step 748, the script generation engine (704) determines that the command in command entry C requires a prerequisite command based on the input parameters in command entry C. In Step 750, the script generation engine (704) requests a command entry with output parameters matching the input parameters in command entry C. In Step 752, the script generation engine (704) receives command entry D. In Step 754, the script generation engine (704) determines that the command in command entry D does not require any prerequisite command based on the input parameters in command entry D. In Step 756, the script generation engine (704) has generated a complete script, and the completed script is transmitted to the testing operating system (716) for execution.

Figure 8:
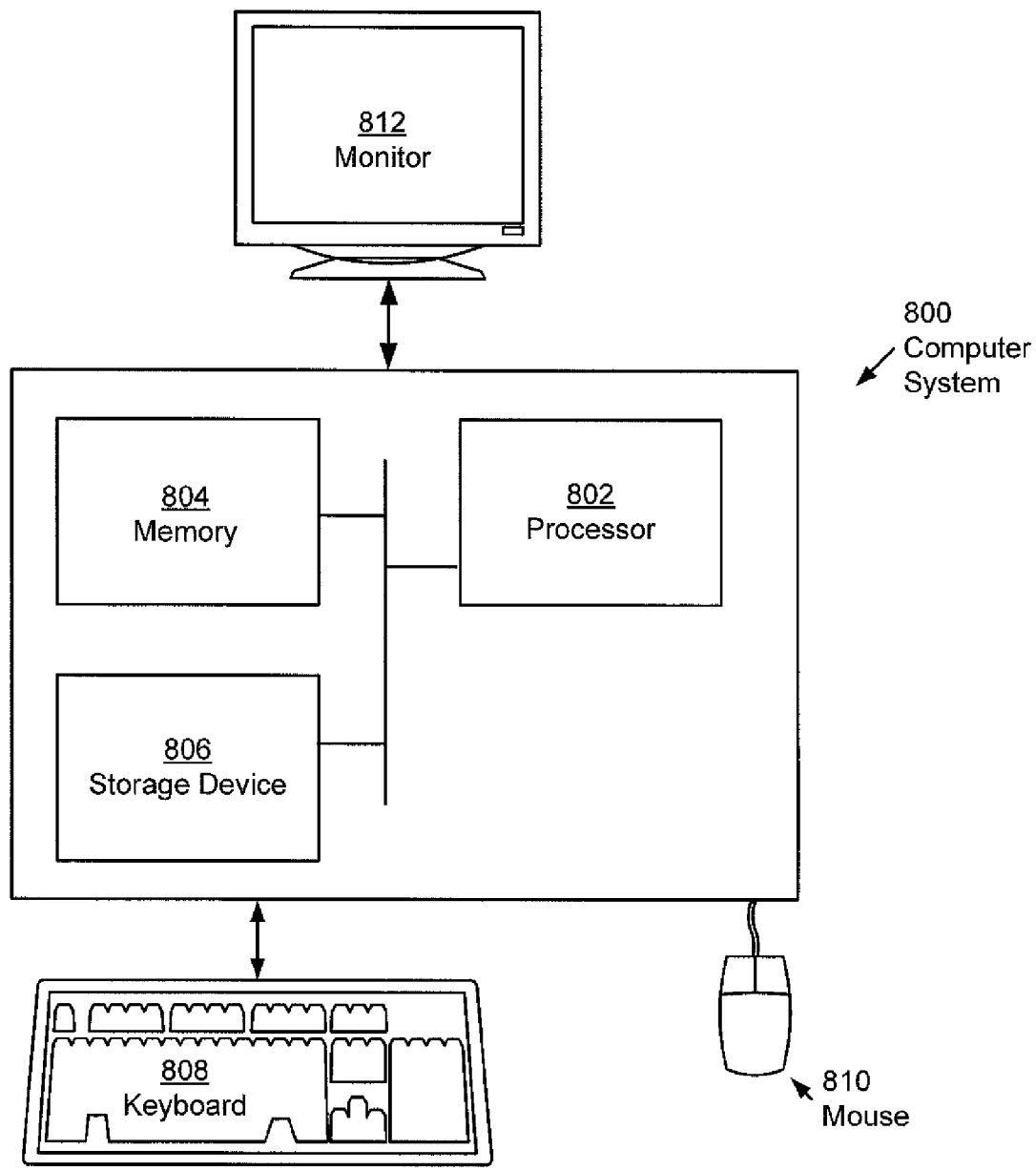
FIG. 8 shows a computer system in accordance with one or more embodiments of the invention.

Embodiments of the invention may be implemented on virtually any type of computer regardless of the platform being used. For example, as shown in FIG. 8, a computer system (800) includes one or more processor(s) (802) such as a central processing unit (CPU) or other hardware processor(s), associated memory (804) (e.g., random access memory (RAM), cache memory, flash memory, etc.), a storage device (806) (e.g., a hard disk, an optical drive such as a compact disk drive or digital video disk (DVD) drive, a flash memory stick, etc.), and numerous other elements and functionalities typical of today's computers (not shown). In one or more embodiments of the invention, the processor (802) is hardware. For example, the processor may be an integrated circuit. The computer system (800) may also include input means, such as a keyboard (808), a mouse (810), or a microphone (not shown). Further, the computer system (800) may include output means, such as a monitor (812) (e.g., a liquid crystal display (LCD), a plasma display, or cathode ray tube (CRT) monitor). The computer system (800) may be connected to a network (814) (e.g., a local area network (LAN), a wide area network (WAN) such as the Internet, or any other type of network) via a network interface connection (not shown). Those skilled in the art will appreciate that many different types of computer systems exist, and the aforementioned input and output means may take other forms. Generally speaking, the computer system (800) includes at least the minimal processing, input, and/or output means necessary to practice embodiments of the invention.

Further, those skilled in the art will appreciate that one or more elements of the aforementioned computer system (800) may be located at a remote location and connected to the other elements over a network. Further, embodiments of the invention may be implemented on a distributed system having a plurality of nodes, where each portion of the invention (e.g., user agreement information, product use agreement pre-recordings, application store, product use agreement application, etc.) may be located on a different node within the distributed system. In one embodiment of the invention, the node corresponds to a computer system. Alternatively, the node may correspond to a processor with associated physical memory. The node may alternatively correspond to a processor or micro-core of a processor with shared memory and/or resources. Further, software instructions in the form of computer readable program code to perform embodiments of the invention may be stored, temporarily or permanently, on a non-transitory computer readable storage medium, such as a compact disc (CD), a diskette, a tape, memory, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A system comprising:
    a processor;
    a memory configured to store:
        a technical documentation file; and
        a command configuration database;
    a script generation engine, executing on the processor and configured to:
        generate a test script comprising a test command instruction obtained from the technical documentation file;
        submit a first query to the command configuration database using the test command instruction;
        receive, in response to the first query, a first command entry comprising an input parameter argument and an input parameter state of the test command instruction;
        submit a second query to the command configuration database using the input parameter argument and the input parameter state;
        receive, in response to the second query, a second command entry comprising a prerequisite command instruction, an output parameter argument, and an output parameter state, wherein the output parameter argument matches the input parameter argument and the output parameter state matches the input parameter state;
        modify the test script to obtain an updated test script, wherein the updated test script comprises the prerequisite command instruction; and
        execute the updated test script on a target operating system, wherein executing the prerequisite command instruction generates an output parameter comprising the output parameter argument and the output parameter state, and wherein executing the test command instruction consumes the output parameter.

2. The system of claim 1, wherein prior to executing the test script on the target operating system, the script generation engine is further configured to:
    submit a third query to the command configuration database using second command entry;
    receive, in response to the second query, a third command entry,
    wherein modifying the test script to obtain a modified updated test script comprises adding an element from the third command entry.

3. The system of claim 1, wherein the script generation engine is further configured to:
    obtain, in response to the executing, a script execution output; and
    verify the script execution output using the technical documentation file.

4. The system of claim 1, wherein modifying the test script to obtain a modified updated test script comprises adding a cleanup command to the test script.

5. The system of claim 1, wherein the technical documentation file comprises human readable text.

6. The system of claim 1, wherein the target operating system is executing on a target computer system, and wherein the test script is executed on the target computer system via a network.

7. The system of claim 1, wherein the target operating system is a patched operating system.

8. A method for generating a test script for an operating system comprising:
    generating a test script comprising a test command instruction obtained from a technical documentation file;
    submitting a first query to a command configuration database using the test command instruction;
    receiving, in response to the first query, a first command entry comprising an input parameter argument and an input parameter state of the test command instruction;
    submitting a second query to the command configuration database using the input parameter argument and the input parameter state;
    receiving, in response to the second query, a second command entry comprising a prerequisite command instruction, an output parameter argument, and an output parameter state, wherein the output parameter argument matches the input parameter argument and the output parameter state matches the input parameter state;
    modifying the test script to obtain an updated test script, wherein the update test script comprises the prerequisite command instruction; and
    executing the test script on a processor on a target operating system, wherein executing the prerequisite command instruction generates an output parameter comprising the output parameter argument and the output parameter state, and wherein executing the test command instruction consumes the output parameter.

9. The method of claim 8, wherein prior to executing the test script on the target operating system:
    submitting a third query to the command configuration database using second command entry;

receiving, in response to the second query, a third command entry,
wherein modifying the test script to obtain a modified updated test script comprises adding an element from the third command entry.

10. The method of claim 8, further comprising:
obtaining, in response to the executing, a script execution output; and
verifying the script execution output using the technical documentation file.

11. The method of claim 8, wherein modifying the test script to obtain a modified updated test script comprises adding a cleanup command to the test script.

12. The method of claim 8, wherein the technical documentation file comprises human readable text.

13. The method of claim 8, wherein the target operating system is executing on a target computer system, and wherein the test script is executed on the target computer system via a network.

14. The method of claim 8, wherein the target operating system is a patched operating system.

15. A non-transitory computer readable medium comprising instructions that, when executed by a processor, perform a method, the method comprising:
generating a test script comprising a test command instruction obtained from a technical documentation file;
submitting a first query to a command configuration database using the test command instruction;
receiving, in response to the first query, a first command entry comprising an input parameter argument and an input parameter state of the test command instruction;
submitting a second query to the command configuration database using the input parameter argument and the input parameter state;
receiving, in response to the second query, a second command entry comprising a prerequisite command instruction, an output parameter argument, and an output parameter state, wherein the output parameter argument matches the input parameter argument and the output parameter state matches the input parameter state;
modifying the test script to obtain an updated test script, wherein the update test script comprises the prerequisite command instruction; and
executing the test script on a processor on a target operating system, wherein executing the prerequisite command instruction generates an output parameter comprising the output parameter argument and the output parameter state, and wherein executing the test command instruction consumes the output parameter.

16. The computer readable medium of claim 1, wherein prior to executing the test script on the target operating system:
submitting a third query to the command configuration database using second command entry;
receiving, in response to the second query, a third command entry,
wherein modifying the test script to obtain a modified updated test script comprises adding an element from the third command entry.

17. The computer readable medium of claim 1, the method further comprising:
obtaining, in response to the executing, a script execution output; and
verifying the script execution output using the technical documentation file.

18. The computer readable medium of claim 1, wherein modifying the test script to obtain a modified updated test script comprises adding a cleanup command to the test script.

19. The computer readable medium of claim 1, wherein the technical documentation file comprises human readable text.

20. The computer readable medium of claim 1, wherein the target operating system is executing on a target computer system, and wherein the test script is executed on the target computer system via a network.

* * * * *

UNITED STATES PATENT AND TRADEMARK OFFICE
CERTIFICATE OF CORRECTION

| | | Page 1 of 1 |
|---|---|---|
| PATENT NO. | : 8,769,487 B2 | |
| APPLICATION NO. | : 13/443436 | |
| DATED | : July 1, 2014 | |
| INVENTOR(S) | : Chandrasekharan | |

It is certified that error appears in the above-identified patent and that said Letters Patent is hereby corrected as shown below:

In the Specification

In column 4, line 27, delete "target" and insert -- Target --, therefor.

In the Claims

In column 12, line 12, in claim 16, delete "claim 1", and insert -- claim 15 --, therefor.

In column 12, line 22, in claim 17, delete "claim 1", and insert -- claim 15 --, therefor.

In column 12, line 28, in claim 18, delete "claim 1", and insert -- claim 15 --, therefor.

In column 12, line 31, in claim 19, delete "claim 1", and insert -- claim 15 --, therefor.

In column 12, line 33, in claim 20, delete "claim 1", and insert -- claim 15 --, therefor.

Signed and Sealed this
Fifteenth Day of September, 2015

Michelle K. Lee
*Director of the United States Patent and Trademark Office*